United States Patent [19]

Hosoi et al.

[11] Patent Number: 4,921,471
[45] Date of Patent: May 1, 1990

[54] APPARATUS FOR SETTING A TABLE FOR A BELT-DRIVEN MACHINE TOOL

[75] Inventors: Mutsuo Hosoi, Kanagawa; Akira Ishibashi, Saitama, both of Japan

[73] Assignee: Okamoto Machine Tool Works, Ltd., Kanagawa, Japan

[21] Appl. No.: 394,809

[22] Filed: Aug. 17, 1989

[51] Int. Cl.$^5$ ............................................. F16H 7/08
[52] U.S. Cl. ..................................... 474/101; 474/198
[58] Field of Search .............. 474/198, 199, 101, 102, 474/109, 111; 108/16; 74/16

[56] References Cited

U.S. PATENT DOCUMENTS

| | | | |
|---|---|---|---|
| 1,318,796 | 10/1919 | Nortman, Jr. | 474/198 |
| 3,466,940 | 9/1969 | Mittag | 474/198 X |
| 3,762,232 | 10/1973 | Muller | 474/101 X |
| 4,708,695 | 11/1987 | Sugiyama | 474/101 |

Primary Examiner—Thuy M. Bui
Attorney, Agent, or Firm—Oblon, Spivak, McClelland, Maier & Neustadt

[57] ABSTRACT

In an arrangement of the present invention, a connecting member is coupled with a belt attached to a saddle, and then a table is arranged on the saddle so that both ends thereof on its underside are connected with both ends of the connecting member. Thus, all the parts are connected with each other without being interfered with by the saddle or the like.

4 Claims, 3 Drawing Sheets

APPARATUS FOR SETTING A TABLE FOR A BELT-DRIVEN MACHINE TOOL

FIELD OF THE INVENTION AND RELATED ART STATEMENT

The present invention relates to an apparatus for setting a table on a belt-driven machine tool, having the table driven by a belt so as to make reciprocating sliding movement.

Conventionally, in small- and medium-sized machine tools provided with a table for reciprocating sliding movement thereon, a table 2 is driven to make reciprocating sliding movement by means of a wire rope 1 as shown in FIG. 4, or the table 2 is driven to make reciprocating sliding movement by means of a timing belt 3 as shown in FIG. 5.

In a machine tool in which the table 2 is driven to make reciprocating sliding movement by means of the wire rope 1 as shown in FIG. 4, the wire rope 1 is wound spirally around a cylindrical drum 4. Therefore, when the drum 4 is rotated for sliding the table 2, the direction of tension of the wire rope 1 acting on the table 2 changes gradually as the table 2 makes the sliding motion. Hence, the table 2 is hindered from making a straight drive, and as a result, it becomes difficult to obtain straightness on the workpiece (not shown) set on the table 2 in the sliding direction of the table 2, and this has been a defect in this arrangement.

Further, there has been a defect, since the wire rope 1 is tightly wound around the drum 4 every time the table 2 is slid, that the wire rope 1 get easily damaged and its life is shortened. Although it is possible to lengthen the life of the wire rope 1 by making the drum 4 larger in diameter, but there occurs a defect that the position of the handle (not shown) for rotating the drum 4 becomes higher as the diameter of the drum 4 is made larger, and hence, operability to slide the table 2 back and forth becomes worse.

In the case of a machine tool in which the table 2 is slid back and force by means of the timing belt 3 as shown in FIG. 5, it is required that the timing belt 3 is connected with the central portion on the underside of the table 2 after the table 2 has been set on a saddle, and it poses a problem that the assembling work of the machine tool is thereby made difficult.

Further, since the timing belt 3 is directly connected to the table 2, there is a defect that vibration from the timing belt 3 is easily transmitted to the table 2, and the accuracy in the surface machining of the workpiece set on the table 2 is lowered by the vibration transmitted from the timing belt 3 to the table 2.

OBJECT AND SUMMARY OF THE INVENTION

A first object of the present invention is to make assembly work of a machine tool easy.

A second object of the present invention is to make the replacement of a belt easy.

A third object of the present invention is to reduce the transmission of vibration from the belt to the table to thereby improve the surface machining accuracy of the workpiece set on the table.

In a machine tool provided with a table set on a saddle and driven to make reciprocating sliding movement by means of a drive of a belt, the apparatus of the present invention comprises a connecting member attached to the belt, the connecting member being arranged between the belt and the table so as to face the belt virtually in parallel with it and both ends of the connecting member being connected to the table on its underside at both ends in the sliding direction. Therefore, in the assembly process of the machine tool, the table is set onto the saddle after the connecting member has been attached to the belt, and thereupon, both ends of the connecting member are connected with the table on its under side at both ends in the sliding direction. Hence, the attaching of the connecting member to the belt and connection of the connecting member to the table become easy and thus the machine tool can be easily assembled. Further, the vibration transmitted from the belt is damped by the connecting member so that the vibration transmitted to the table is reduced and hence the surface machining accuracy of the workpiece set on the table is improved.

DETAILED DESCRIPTION OF THE PREFERRED EMBODIMENTS

Figure 1:
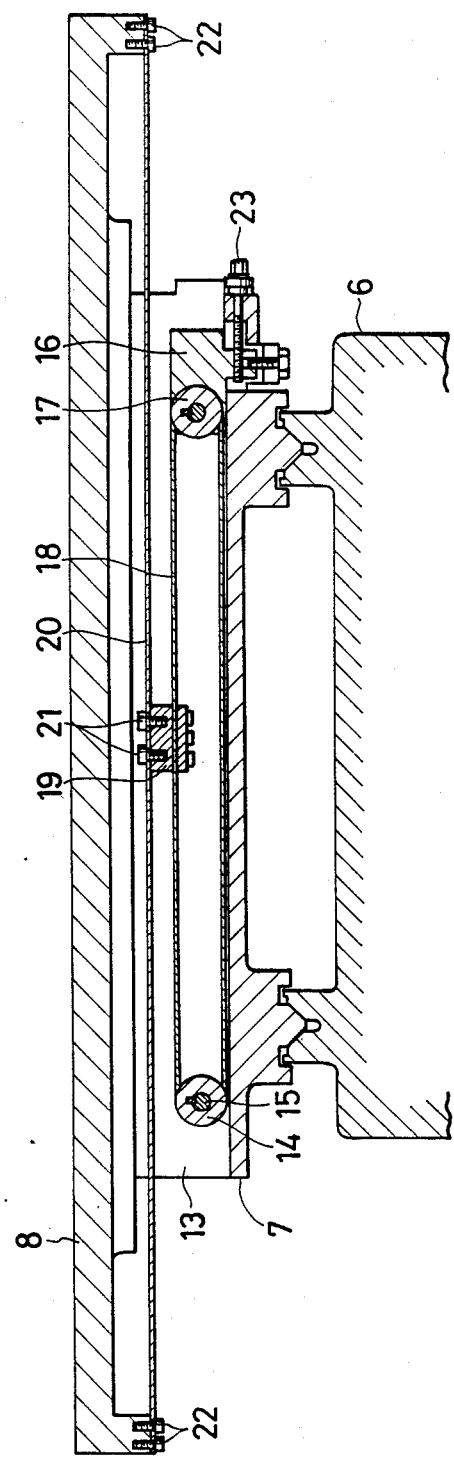
FIG. 1 is a longitudinal sectional front view showing an installed state of a table.
Figure 2:
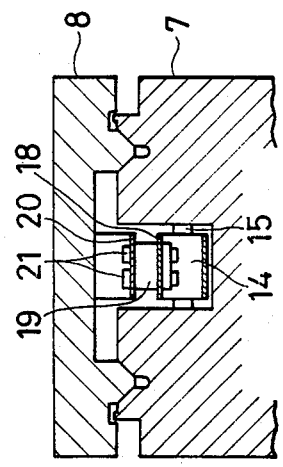
FIG. 2 is a longitudinal sectional side view showing an installed state of a table.
Figure 3:
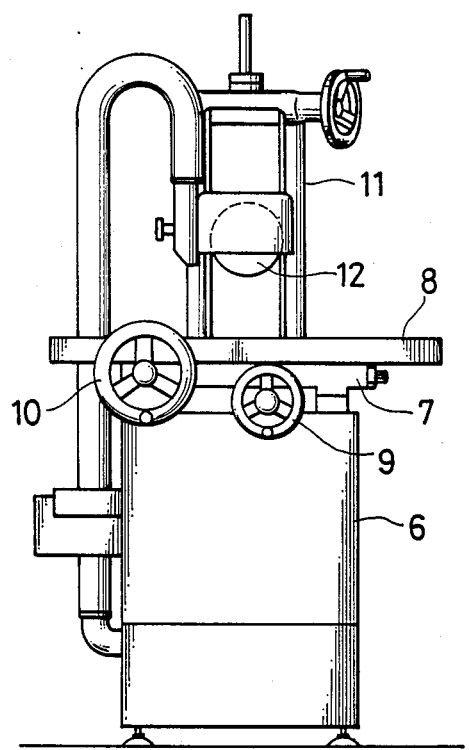
FIG. 3 is a schematic diagram showing the whole of a machine tool.
Figure 4:
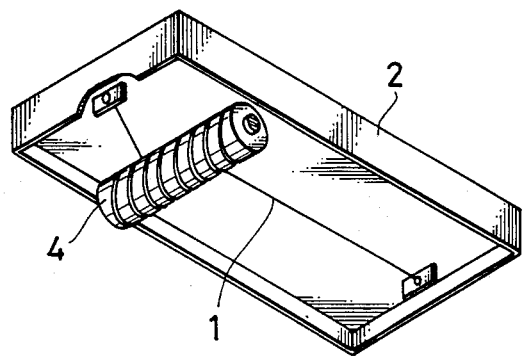
FIG. 4 is a perspective view showing a prior art example of a wire rope drive.
Figure 5:
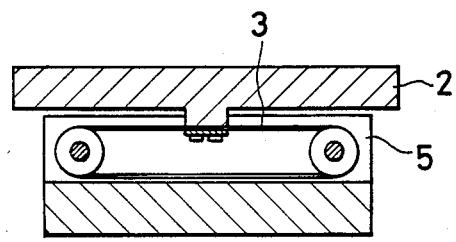
FIG. 5 is a front view showing a prior art example of a belt drive.

An embodiment of the present invention will be described with reference to FIG. 1 to FIG. 3. In a machine tool, as schematically shown in FIG. 3, a saddle 7 is set on a base 6 for reciprocating sliding motion backward and forward and a table 8 is set on the saddle 7 for reciprocating sliding motion leftward and rightward. The base 6 is provided with a handle 9 for slidably operating the saddle 7 and the saddle 7 is provided with a handle 10 for slidably operating the table 8. On the base 6 is erected a column 11 and to this column 11 is attached a grinding wheel 12 for grinding work for sliding motion up and down.

In the center of the top face of the saddle 7, there is made an elongated recess 13 from side to side. A sprocket 14 is fixedly attached to one end of the recess 13, and a spindle 15 for the handle 10 is inserted into the center of the sprocket 14. To the other end of the recess 13 is attached a sprocket holder 16 in such a way that its position is adjustable along the length of the recess 13. An endless timing belt 18 as a belt is passed around a sprocket 17 held by the sprocket holder 16 and the sprocket 14.

To the timing belt 18, a metal fitting 19 is fixedly attached in such a way that it clamps the timing belt 18 from above and below. Meanwhile, there is provided a steel plate 20 as a connecting member arranged between the timing belt 18 and the table 8, facing the timing belt 18 virtually in parallel with it. The portion virtually in the center of the steel plate 20 is connected with the metal fitting 19 with a plurality of bolts 21. The steel plate 20 is in a thin strip form. The steel plate 20 is extended from side to side along the recess 13 and both ends of the steel plate 20 are fixed to the underside of the table 8 at both its left and right ends with bolts 22.

With the described arrangement, when the handle 10 is turned, the timing belt 18 passed around the sprockets 14 and 17 is turned, and as the timing belt 18 is turned, the metal fitting 19, the steel plate 20, and the table 8 together slide sideways. Since the timing belt 18 and the table 8 are coupled here through the metal fitting 19 and the steel plate 20, the vibration transmitted from the timing belt 18 to the table 8 is damped so that vibration transmitted to the table 8 is reduced and the surface machining accuracy of the workpiece set on the table 8 can be improved. Further, in whichever direction may the table 8 slide, the action of the force from the timing belt 18 to slide the table 8 is in a fixed direction at all times so that the table 8 makes a completely straight movement.

In the assembly process of the machine tool, the timing belt 18 is passed around the sprockets 14 and 17 with the table 8 removed from the saddle 7. At this time, by turning an adjustment bolt 23, the sprocket holder 16 is slid along the length of the recess 13 and thereby the tension of the timing belt 18 is adjusted. Thereafter, the metal fitting 19 is fixed in place on the timing belt 18 and the steel plate 20 is connected with the metal fitting 19. The setting of the timing belt 18 and fixing of the metal fitting 19 can be performed easily since these operations are done with the table 8 removed. After the fixing of the metal fitting 19 to the timing belt 18 and the connection of the steel plate 20 with the metal fitting 19 have been finished, the table 8 is set on the saddle 7 and both ends of the steel plate 20 are connected to the table 8 on its underside at both ends in the sliding direction. Since, here, the steel plate 20 is connected to the table 8 at both ends of the table 8, the saddle 7 or the base 6 does not interfere with the connecting job and therefore the connecting job can be performed easily.

Although, in the above described embodiment, the metal fitting 19 was fixed to the timing belt 18 and the steel plate 20 as a connecting member was connected with the metal fitting 19, it may also be practiced to provide a connecting member by forming the metal fitting 19 and the steel plate 20 integral and connect the connecting member with the timing belt 18.

What is claimed is:

1. In a machine tool provided with a table set on a saddle and driven to make reciprocating sliding movement by means of a drive of a belt, an apparatus for setting the table on the belt-driven machine tool comprising a connecting member attached to said belt, said connecting member being arranged between said belt and said table so as to face the belt virtually in parallel therewith and both ends of said connecting member being connected to said table on its underside at both ends in the sliding direction.

2. The apparatus for setting the table on the belt-driven machine tool according to claim 1, wherein said connecting member is made of a thin steel plate in a strip form.

3. The apparatus for setting the table on the belt-driven machine tool according to claim 1, wherein said connecting member is formed integral with a metal fitting to be fixed to said belt.

4. The apparatus for setting the table on the belt-driven machine tool according to claim 1, wherein the belt is an endless strap form is horizontally installed on the saddle, a metal fitting is fixed to said belt, the horizontal connecting member is connected to the metal fitting, and both ends of said connecting member are connected to both ends of said table arranged on said saddle.

* * * * *